(12) United States Patent
Haaf

(10) Patent No.: US 8,521,346 B2
(45) Date of Patent: Aug. 27, 2013

(54) METHOD FOR OPERATING A RAIL VEHICLE

(75) Inventor: Stefan Haaf, Gaukoenigshofen (DE)

(73) Assignee: Siemens Aktiengesellschaft, Munich (DE)

( * ) Notice: Subject to any disclaimer, the term of this patent is extended or adjusted under 35 U.S.C. 154(b) by 4 days.

(21) Appl. No.: 13/265,905

(22) PCT Filed: Apr. 7, 2010

(86) PCT No.: PCT/EP2010/054591
§ 371 (c)(1),
(2), (4) Date: Oct. 24, 2011

(87) PCT Pub. No.: WO2010/121901
PCT Pub. Date: Oct. 28, 2010

(65) Prior Publication Data
US 2012/0065818 A1 Mar. 15, 2012

(30) Foreign Application Priority Data
Apr. 23, 2009 (DE) .......................... 10 2009 018 616

(51) Int. Cl.
*G05D 1/00* (2006.01)
(52) U.S. Cl.
USPC ........................................... 701/20; 246/182
(58) Field of Classification Search
USPC ........................................... 701/20; 246/182
See application file for complete search history.

(56) References Cited

U.S. PATENT DOCUMENTS

| | | |
|---|---|---|
| 3,891,833 A | 6/1975 | Rhoton et al. |
| 5,239,472 A | 8/1993 | Long et al. |
| 5,549,365 A | 8/1996 | Vernier et al. |
| 6,805,326 B1 | 10/2004 | Baier |

FOREIGN PATENT DOCUMENTS

| | | |
|---|---|---|
| DE | 199 46 224 A1 | 4/2001 |
| DE | 101 59 957 A1 | 6/2003 |
| WO | 01/07309 A1 | 2/2001 |

OTHER PUBLICATIONS

Bocharnikov et al.: "Optimal driving strategy for traction energy saving on OC suburban railways", IET Electr.Power Appl., 2007, 1, pp. 675-682.
Wong et al.: "Coast control for mass rapid transit railways with searching methods", IEE Proc.-Elect. Power Appl. vol. 151, No. 3, May 2004, pp. 365-376.
Linder et al: "Energiesparsame Fahrweise in Nahverkehr"—ETR Eisenbahntechnische Rundschau, Hestra-Verlag. Darmstadt , DE, vol. 51, No. 7/8, Jul. 2, 2002 , pp. 432,434-438, XP007906699—English abstract on p. 438.

*Primary Examiner* — Thomas Tarcza
*Assistant Examiner* — Garrett Evans
(74) *Attorney, Agent, or Firm* — Laurence A. Greenberg; Werner H. Stemer; Ralph E. Locher

(57) ABSTRACT

A method for operating a rail vehicle includes coasting point determination for a route section. Upon reaching that point, vehicle traction is deactivated and coasting occurs over at least part of the remaining route to a route section end. Coasting points are stored for the route section and assigned a fixed distance and fixed travel time to the section end. Upon passing the route section, continuous evaluation is performed whether a currently recorded distance to the section end is shorter than the fixed distance to the route section end for one coasting point according to a first condition, and whether a current travel time to the section end is longer than or equal to the fixed travel time to the section end according to a second condition. Possible traction deactivation is signaled when fulfilling both conditions. If not fulfilled, another stored coasting point is evaluated for fulfillment of the conditions.

20 Claims, 2 Drawing Sheets

METHOD FOR OPERATING A RAIL VEHICLE

BACKGROUND OF THE INVENTION

Field Of The Invention

The invention relates to a method for operating a rail vehicle, in which at least one coasting point is defined for a predefined route section, wherein when said point is reached the traction of the rail vehicle can be deactivated and the rail vehicle can coast over at least part of the remaining route to an end of the route section.

The objective of such a method is to save energy when operating the rail vehicle. For this purpose, what are referred to as coasting points have already been known for a long time. These are points on a route section, wherein when said point is reached a driver of the rail vehicle is intended to deactivate the traction and coast in the direction of the end of the route section. Until now, an individual coasting point was defined for a predefined route section, where said coasting point was tailored to a fixed time margin for a remaining distance to the end of the route section. Such a coasting point can therefore be optimum in terms of energy or applicable on the route section only for a specific time margin. This is considered to be disadvantageous.

BRIEF SUMMARY OF THE INVENTION

Taking this as a basis, the invention is based on the object of developing the known method for operating a rail vehicle in such a way that it is possible to travel more economically in terms of energy.

This object is achieved in the method specified at the beginning in that for the predefined route section a plurality of coasting points are stored in advance and are each assigned a fixed distance from the end of the route section and a fixed travel time until the end of the route section is reached, and when the predefined route section is traveled through it is continuously checked whether for one of the coasting points a currently detected distance to the end of the route section is shorter than the fixed distance to the end of the route section according to a first condition, and whether a current travel time to the end of the route section is longer than or equal to the fixed travel time to the end of the route section according to a second condition, and when both conditions are fulfilled, possible deactivation of the traction of the rail vehicle is signaled, whereas when both conditions are not fulfilled a further coasting point of the stored coasting points is checked for fulfillment of the two conditions.

It is therefore possible to detect, depending on the current position and time, an optimum coasting point in an adaptive fashion as far as the destination and to inform the driver of the vehicle of this.

Owing to the fact that a plurality of coasting points, for example between 10 and 20, are defined for the predefined route section, which can be defined, for example, between two stops of a rail vehicle, the probability that one of these coasting points can be used in order to save energy is significantly increased compared to the prior art. This is because the coasting points differ in their value pairs which are composed of the fixed distance and the fixed travel time until the end of the route section is reached.

For a coasting point, the fulfillment of the first condition is preferably checked first, and then the fulfillment of the second condition is checked.

The possible deactivation of the traction of the rail vehicle is advantageously signaled to the driver of the rail vehicle. This can be done acoustically and/or optically. In this case, the driver of the rail vehicle reacts to the signal by moving, for example, the drive lever of the rail vehicle into the neutral position so that the traction is deactivated.

Alternatively, when the first and second conditions for a coasting point are fulfilled, the traction of the rail vehicle can also automatically be deactivated. In this case, it is, however, appropriate to signal the automatic deactivation to the driver of the rail vehicle who is ultimately responsible for the safety of the rail vehicle.

In order to carry out the method it is necessary for a current distance and a current travel time of the rail vehicle to an end of a route section or to the next stop to be determined. In order to be able to acquire these current data, it is advantageous if measured variables are included in the calculation thereof, which variables are selected from the group which comprises information relating to the position of the end of the route section and/or to the length of the route section from a stored timetable, a destination time relating to the reaching of the end of the route section from a stored timetable, detection of the predefined route section, information relating to the current position of the rail vehicle, detection of the distance of a route traveled along and a current vehicle speed. These variables can, to a certain extent, be redundant if, for example, the current position of the rail vehicle is determined either by means of the global positioning system (GPS) or by means of the detection of the distance of a route traveled along. Alternatively, the destination time relating to the reaching of the end of the route section and further route information can also be transmitted from the control room by radio.

The coasting points can be calculated in advance on a basis which includes a braking characteristic curve of the rail vehicle. In this context, the braking characteristic curve can be, in particular, one for regenerative braking, which entails additional energy saving potential.

For a predefined route section a plurality of brake application points can be stored in advance and are, each assigned a fixed distance to the end of the route section and a fixed vehicle speed, and when the predefined route section is traveled through it is continuously checked whether for one of the brake application points a currently detected distance to the end of the route section is shorter than the fixed distance to the end of the route section according to a third condition, and whether a current vehicle speed is higher than or equal to the fixed speed of the associated brake application point according to a fourth condition, and when both the third and fourth conditions are fulfilled, a request to initiate a braking process for the rail vehicle is signaled. The expected reaction time of the driver can optionally also be included in the calculation of the brake application points.

This ensures that there is reliable detection of when braking the rail vehicle has to be initiated in order to reach the destination station or the end of the route section with a predefined braking characteristic curve.

The request to initiate a braking process can be signaled to a driver of the rail vehicle, so that the latter triggers the process. Alternatively, it is also possible that when both the third and the fourth conditions are fulfilled, a braking process for the rail vehicle is initiated automatically. In such a case, signaling of the automatic initiation of the braking process to the driver of the rail vehicle is again appropriate.

Of course, a braking characteristic curve of the rail vehicle which is, if appropriate, selected in advance and also is the basis for the calculation of the coasting points is included in a calculation of the brake application points. In this context, it is also possible, in particular, to select a characteristic curve for regenerative braking.

Since in the case of regenerative braking the brake lever for carrying out the braking process has to be adjusted, it is favorable if a setpoint position of the brake lever for carrying out the braking process is displayed to the driver of the rail vehicle on a display device.

In order to save energy further, it may be favorable if during the braking process a brake force which can be requested is limited automatically as a function of a current vehicle speed in such a way that regenerative braking is predominantly or even also exclusively carried out. In this context, a limiting means can be activated only when the brake lever does not exceed a predetermined minimum deflection which can correspond to a value of, for example, 50% of the overall deflection of the brake lever.

The method overall is preferably carried out between two stops towards the end of the journey, for example in the last third of the route section. This ensures that a risk of delays is minimized.

For a coasting point, an additional condition according to which the rail vehicle has a minimum speed is preferably also checked. This minimum speed must ensure that the rail vehicle travels at such a speed that a time reserve which is considered to be sufficient actually permits the desired coasting movement of the rail vehicle up to an end of the route section.

BRIEF DESCRIPTION OF THE SEVERAL VIEWS OF THE DRAWING

Exemplary embodiments of the invention will be explained in more detail below with reference to the drawings in which.

DESCRIPTION OF THE INVENTION

Figure 1:
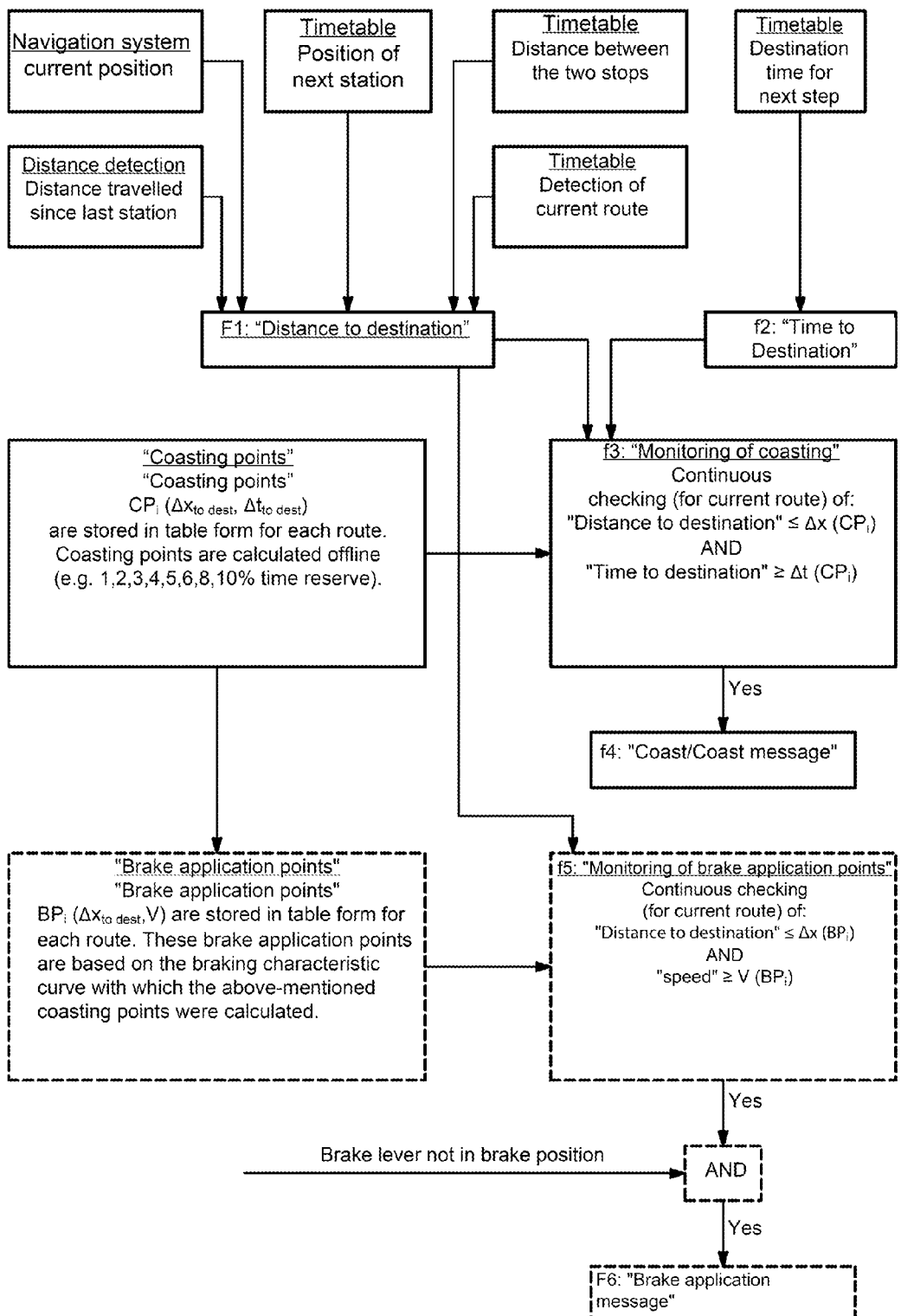
FIG. 1 shows an overview block diagram illustrating a method for operating a rail vehicle in an energy-saving fashion and, FIG. 2 shows a graphic illustration of the profile of a velocity of a rail vehicle as a function of the distance from a start of a route section.

The upper area of FIG. 1 illustrates the way in which two core variables of a method for operating a rail vehicle are acquired in an energy-saving fashion. A first core variable here is a current distance from an end f1 of a route section. This distance is calculated on an up-to-date basis using a plurality of input data items. These input data items originate from a navigation system which represents a current position of the rail vehicle, a distance detection means which represents a distance traveled since a last station or since the start of the route section, as well as a timetable, the information relating to the position of the next station or the end of the route section, a distance between the previous station and the upcoming station or a length of the route section and information about which current route is present can be obtained. A current distance of the rail vehicle from the next destination, specifically the end of the route section, can be readily calculated from the data items which come from the stored timetable, the navigation system and the distance detection means.

Expressed in general terms, the function f1 continuously calculates the current distance of the rail vehicle to the destination station or end of the route section from the input values specified above. In the simplest case, this can be done by subtraction of the location coordinates of the destination station and of the current position. As an alternative a comparison of the distance traveled with the overall length of the route can also be used.

However, a procedure in which the various information items are compared with one another and optimized is favorized. This may be, implemented, for example, by means of a Kalman filter. This has the advantage that the various strengths of the different information items can be utilized and therefore a higher level of accuracy and reliability of the system can be achieved. In addition, the method can continue to be carried out in the event of failure of a system, for example loss of the position information in the case of GPS. As an alternative to the direct data items of the distance detection means (standard information from the vehicle control system) it may be advantageous to allow the raw data (axle rotation speeds, radar speed, identified rotation speeds, etc.) to be input into the above-mentioned optimizer. In addition to the actual speed signals, validity information relating to these signals is then also required as well as information about the state of the vehicle (acceleration, coasting, braking, current traction force, current braking force, etc.). On the basis of this information, the optimizer can then utilize the respective best information to determine the distance information and to correct the errors of the individual speed signals separately in a state-dependent fashion.

In addition, this function can also supply information about the quality of the distance information which is determined. The system can then express or suppress a coasting recommendation depending on the quality of the distance information which is determined.

The second core variable for the method is the travel time to the end f2 of the route section. For the calculation thereof, again in turn recourse is made to the timetable from which a destination time for the reaching of the next station or the end of the route section can be obtained. Optionally, the destination time for the reaching of the next station can also be transferred to the system/updated by radio. The travel time to the end of the route section can be determined by using the current time.

The two variables for f1, f2 are determined on an up-to-date basis continuously over the entire journey of the rail vehicle through the route section.

The method which is to be carried out includes coasting points which is included offline using as a basis a braking characteristic curve which can be selected if appropriate and may be exclusively regenerative or else linear. For each route section, coasting points $CP_i$ are stored in table form. In this context, each coasting point $CP_i$ is assigned a value pair ($\Delta x$, $\Delta t$), wherein $\Delta x$ is a fixed distance to the end of the route section for a respective coasting point $CP_i$, while $\Delta t$ signifies a fixed time period, likewise to the end of the route section. It is also optionally possible to store a minimum speed for the above coasting point $CP_i$ ($\Delta x$, $\Delta t$, $v_{min}$) in order to increase the robustness of the algorithm.

If, for example, a total route has five route sections, for example 10 to 20 coasting points can be calculated for each individual route section. In this context, the sequence of coasting points can correspond to time reserves of, for example, 1%, 2%, 3%, 4%, 5%, 6%, 8%, 10%, wherein in each case associated fixed distances to the end of the route section are to be calculated, with the result that overall the rail vehicle can keep to its timetable up to this end of the route section exclusively by coasting. In this context, a time reserve is to be understood as a time period which results from the difference between the fastest possible time for traveling through the route section and the available time for traveling through the route section.

The calculation of the coasting points for a specific route section can include a multiplicity of variables. In addition to the braking force characteristic curve which is selected for the rail vehicle, topographical variables are used, for example a speed profile of the route, the altitude profile thereof, the presence of a tunnel, if appropriate also radii of bends which occur. Furthermore, it is possible to take into account: traction force characteristic curves, driving performance levels/braking performance levels (efficiency), vehicle mass, driving resistance, predefined jolt values, a permissible useful current, a permissible feedback current etc.

For when a route section is traveled through, monitoring f3 of coasting points takes place. This signifies continuous checking for a current route section of:

"Distance from the end of the route section" $\leq \Delta x$ ($CP_i$)
AND
"Travel time to the end of the route section" $\geq \Delta t$ ($CP_i$).

If minimum speeds are additionally stored for the coasting points, the above continuous checking is expanded with the following AND condition:

AND
"Current speed" $\geq v_{min}$ ($CP_i$).

The function f3 continuously checks for the respective current route or the current route section whether the two above-mentioned conditions are fulfilled for one of the stored coasting points. If both conditions are fulfilled for a coasting point, this signifies that sufficient time is present to deactivate the traction of the rail vehicle and to allow the rail vehicle to coast in the direction of the target station or end of the route section.

If it is detected for one or more coasting points which have been calculated in advance that both the first and the second condition are fulfilled (and optionally the third condition of the minimum speed), a costing message f4 is issued to a driver of the rail vehicle. The latter can then easily deactivate the traction of the rail vehicle, specifically by moving the brake lever into its neutral position. It is alternatively also possible for the traction to be deactivated automatically, wherein a corresponding acoustic and/or optical message is then issued to the driver of the rail vehicle. If automatic deactivation of the traction is permitted, this must, however, be capable of being activated separately so that the driver of the rail vehicle can also prohibit the automatic deactivation of the traction.

In addition it is possible for the method to perform a memory input when the driver does not implement the coasting message within a specified time.

It is possible for a coasting message to be issued repeatedly as the route section is traveled through. It is favorable if the saving of energy through the coasting of the rail vehicle tends to occur at the end of a route section. If the saving of energy were to tend to take place at the start, there is the risk of unforeseen delays in a later part of the route section resulting in failure to comply with the timetable.

After the rail vehicle travels with deactivated traction owing to a coasting message, this state persists until a brake application point for destination station braking has been reached.

In the method, offline-calculated brake application points $BP_i$ are additionally stored in table form, specifically in turn for each route section which the rail vehicle travels through. These brake application points are based on the braking characteristic curve with which the coasting points mentioned above were calculated. Each brake application point $BP_i$ is assigned a value pair ($\Delta x$ to the end of the route section, v), where v signifies a current velocity of the rail vehicle.

Monitoring f5 of the brake application point proceeds as follows: checking is carried out continuously for a current route section of:

"Distance to the end of the route section" $\leq \Delta x$ ($BP_i$)
AND
"Speed" $> v$ ($BP_i$).

In this way, a third and a fourth condition are defined which when they are both fulfilled result in a message f6 that braking of the rail vehicle must now take place. The outputting of this message is linked to the fact that the brake lever is currently not in the "brake" position.

The message function f6 indicates to the driver of the rail vehicle that he should initiate braking to the destination station or to the end of the route section with the selected braking characteristic curve which was also included in the calculation of the coasting points. The message is in turn issued to the driver of the rail vehicle visually and/or acoustically. If a non-constant braking characteristic curve is selected, such as occurs, for example, in the case of exclusively regenerative electric braking, the setpoint position of the brake lever can then be displayed to the driver on a display device. Since a non-constant braking characteristic curve always requires adjustment of the brake lever by the driver of the rail vehicle, wherein the adjustment depends on a current vehicle speed, the following can be provided: in the case of this particularly selected energy saving option with exclusively regenerative braking, the required braking force is automatically limited as a function of the current vehicle speed during the destination braking in such a way that only exclusively regenerative braking is used. This is activated only when the brake lever does not exceed a specific minimum deflection of, for example, 50% of its overall deflection.

The method which is presented is suitable for providing the driver of the rail vehicle with messages relating to energy-saving travel adaptively as a function of a current time reserve. The method is simple and robust.

Figure 2:
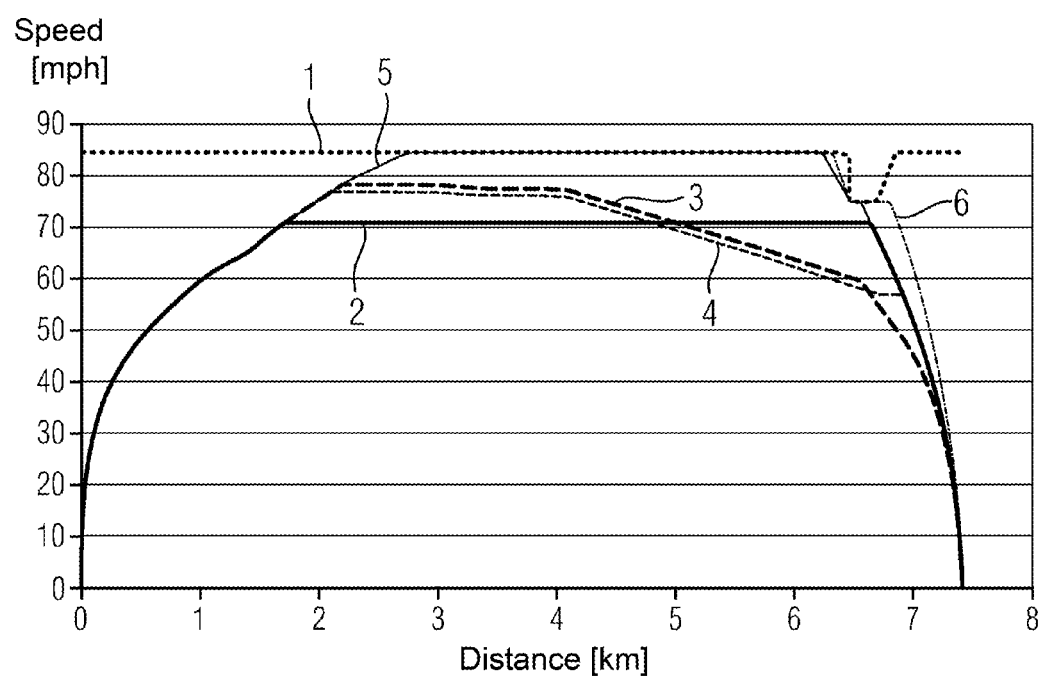

With reference to FIG. 2, a comparison will now be made between various operating modes for traveling through a predefined route section. On the left of FIG. 2, the start of the route section, for example a departure station, is located, while on the right-hand side the destination station and therefore the end of the route section is located at distance of approximately 7.4 km from the starting station.

In FIG. 2, a dashed line 1 denotes a route speed profile, a continuous line 2 denotes travel through at a reduced route speed, a continuous line 3 travel through with a time reserve and exclusively regenerative braking, a continuous line 4 denotes travel through with a time reserve and linear braking, a continuous line 5 denotes rapid travel through and linear braking and a continuous line 6 denotes a reference travel pattern for high-speed travel through and full braking.

The table below contains the results relating to energy-saving effects:

| Travel pattern | Time | Timetable | Energy saving |
|---|---|---|---|
| Reference travel pattern | 257.2 | 288.6 | |
| Rapid travel through with linear braking | 264.7 | 288.6 | 10.1% |
| Travel through with time reserve and linear braking | 288.6 | 288.6 | 41.9% |
| Travel through with time reserve and exclusively regenerative braking | 288.6 | 288.6 | 49.1% |
| Travel through with reduced route speed | 287.5 | 288.6 | 29.3% |

The above-mentioned savings are dependent on many influencing factors (topology, timetable, feedback capability of power system, etc.) and indicate possible energy savings on an exemplary basis.

The invention claimed is:

1. A method for operating a rail vehicle, the method comprising the following steps:
    defining at least one coasting point for a predefined route section for deactivating traction of the rail vehicle and permitting the rail vehicle to coast over at least part of a remaining route to an end of the route section, upon reaching the at least one coasting point;
    storing a plurality of the coasting points in advance for the predefined route section and assigning each of the coasting points a fixed distance from the end of the route section and a fixed travel time until reaching the end of the route section;
    upon traveling through the predefined route section, continuously checking if for one of the coasting points a currently detected distance to the end of the route section is shorter than the fixed distance to the end of the route section according to a first condition, and if a current travel time to the end of the route section is longer than or equal to the fixed travel time to the end of the route section according to a second condition;
    signaling possible deactivation of the traction of the rail vehicle when the first and second conditions are fulfilled, and checking a further coasting point of the stored coasting points for fulfillment of the first and second conditions when at least one of the first and second conditions are not fulfilled; and
    deactivating the traction of the rail vehicle in response to the signaling.

2. The method according to claim 1, which further comprises initially checking the fulfillment of the first condition and then checking the fulfillment of the second condition, for a coasting point.

3. The method according to claim 1, which further comprises signaling a possible deactivation of the traction of the rail vehicle to a driver of the rail vehicle.

4. The method according to claim 1, which further comprises automatically deactivating the traction of the rail vehicle when both the first and second conditions for a coasting point are fulfilled.

5. The method according to claim 4, which further comprises signaling the automatic deactivation of the traction to a driver of the rail vehicle.

6. The method according to claim 1, which further comprises calculating the current distance to the end of the route section and the current travel time to the end of the route section by including measured variables selected from the group consisting of information relating to a position of the end of the route section and/or to a length of the route section from a stored timetable, a destination time relating to reaching the end of the route section from a stored timetable, detection of a predefined route section, information relating to a current position of the rail vehicle, detection of a distance traveled along a route and a current vehicle speed.

7. The method according to claim 1, which further comprises calculating the coasting points in advance on a basis which includes a braking characteristic curve of the rail vehicle.

8. The method according to claim 7, which further comprises selecting a characteristic curve for regenerative braking for the braking.

9. The method according to claim 1, which further comprises:
    storing a plurality of brake application points in advance for the predefined route section and assigning a fixed distance to the end of the route section and a fixed vehicle speed to each of the brake application points;
    upon traveling through the predefined route section, continuously checking, for one of the brake application points, if a currently detected distance to the end of the route section is shorter than the fixed distance to the end of the route section according to a third condition, and if a current vehicle speed is higher than or equal to the fixed speed of the associated brake application point according to a fourth condition; and
    signaling a request to initiate a braking process for the rail vehicle upon fulfilling both the third and fourth conditions.

10. The method according to claim 9, which further comprises signaling the request to initiate a braking process to a driver of the rail vehicle.

11. The method according to claim 9, which further comprises automatically initiating a braking process for the rail vehicle when both the third and the fourth conditions are fulfilled.

12. The method according to claim 11, which further comprises signaling the automatic initiation of a braking process to a driver of the rail vehicle.

13. The method according to claim 9, which further comprises calculating the brake application points in advance on a basis which includes a braking characteristic curve of the rail vehicle which is also included in the calculation of the coasting points.

14. The method according to claim 13, which further comprises selecting a characteristic curve for exclusively regenerative braking for the braking.

15. The method according to claim 14, which further comprises displaying a setpoint position of a brake lever for carrying out the braking process to a vehicle driver on a display device of the rail vehicle.

16. The method according to claim 15, which further comprises automatically limiting a brake force which can be requested, during the braking process, as a function of a current vehicle speed to ensure that exclusively regenerative braking is carried out.

17. The method according to claim 16, which further comprises activating the automatic limiting only when the brake lever does not exceed a predetermined minimum deflection.

18. The method according to claim 17, wherein the predetermined minimum deflection corresponds to a value of 50% of an overall deflection of the brake lever.

19. The method according to claim 1, which further comprises carrying out the method at the end of the route section.

20. The method according to claim 1, which further comprises additionally checking a fulfillment of a condition according to which the rail vehicle has a minimum speed for a coasting point.

* * * * *